United States Patent [19]

Seita et al.

[11] 4,132,682
[45] Jan. 2, 1979

[54] PROCESS FOR PREPARING CATION-EXCHANGE MEMBRANE

[75] Inventors: Toru Seita; Kenji Takahashi; Shunichi Asami; Akihiko Shimizu, all of Shin-nanyo, Japan

[73] Assignee: Toyo Soda Manufacturing Co., Ltd., Yamaguchi, Japan

[21] Appl. No.: 810,628

[22] Filed: Jun. 27, 1977

[30] Foreign Application Priority Data

Aug. 31, 1976 [JP] Japan ................................ 51/103244

[51] Int. Cl.$^2$ .................. C08F 259/08; C08F 265/02; C08F 273/00; C08J 5/22
[52] U.S. Cl. ................................ 521/27; 204/159.17; 204/180 P; 210/500 M; 260/879; 260/884; 526/247
[58] Field of Search ................. 260/2.2 R; 204/159.17

[56] References Cited

U.S. PATENT DOCUMENTS 3,839,172  10/1974  Chapiro ........................... 204/159.17
4,012,303  3/1977   D'Agostino et al. ........... 204/159.17

Primary Examiner—Stanford M. Levin
Attorney, Agent, or Firm—Oblon, Fisher, Spivak, McClelland & Maier

[57] ABSTRACT

A cation-exchange membrane is prepared by impregnating a diene monomer having carboxylic acid group or a functional group which can be converted to a carboxylic acid group, into a fluorinated polymer membrane having cation-exchangeable groups; partially polymerizing said diene monomer; swelling the membrane with a water miscible organic solvent and heat-treating the swollen membrane and if necessary, converting the functional groups to carboxylic acid groups.

11 Claims, No Drawings

PROCESS FOR PREPARING CATION-EXCHANGE MEMBRANE

BACKGROUND OF THE INVENTION

1. Field of the Invention

The present invention relates to a process for preparing a cation-exchange membrane which has excellent electrical characteristics and cation selective permeability, chemical resistance, heat resistance and mechanical strength. More particularly, it relates to a process for preparing a cation-exchange membrane which is suitable as a diaphragm for electrolysis of an alkali metal halide.

2. Description of the Prior Art

Cation-exchange membranes have been used in various industries because of their excellent electrical characteristics and cation selective permeability.

Various cation-exchange membranes have been proposed since the electrolysis processes using an ion-exchange membrane have been developed. However, a cation-exchange membrane having satisfactory cation selective permeability, chemical resistance and electric characteristics has not been found.

The conventional cation-exchange membranes have high resistance to the permeation of most anions; however, they have disadvantages such as remarkably high mobility of anions when the electrolyte is an aqueous solution containing hydroxyl ions in comparison with other cases.

The phenomenon is observed because the permeation of hydroxyl ions can not be effectively prevented since the mobility of hydroxyl ions in an aqueous solution is remarkably high in comparison with the other anions.

When the cation-exchange membrane is used with solutions containing hydroxyl ions, for example as a diaphragm for electrolysis of sodium chloride, the current efficiency is lowered disadvantageously because of the phenomenon.

Accordingly, it has been required to develop a cation-exchange membrane having high durability and high resistance to permeation of hydroxyl ions in these usages of the cation-exchange membrane.

The inventors have studied to develop a cation-exchange membrane for satisfying the requirements of durability and permeation of hydroxyl ions.

SUMMARY OF THE INVENTION

It is an object of the present invention to provide a process for preparing a cation-exchange membrane which has high durability and high selective permeability.

The foregoing and other objects of the present invention have been attained by impregnating a diene monomer having a carboxylic acid group or a functional group which can be converted to a carboxylic acid group into a fluorinated polymer membrane having cation-exchangeable groups and partially polymerizing said diene monomer; swelling the membrane with a water miscible organic solvent and heat treating the swollen membrane and if necessary converting the functional groups to carboxylic acid groups.

Typical fluorinated polymers having cation-exchangeable groups have the following units. The units may have groups which can be converted into cation-exchangeable groups.

(A) Sulfonic acid type fluorinated polymers:

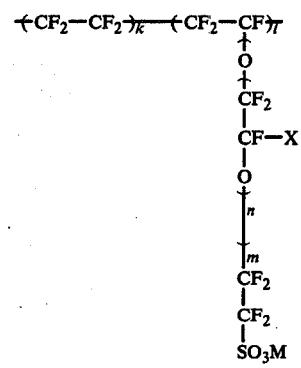

$X = -CF_3, -CF_2-O-CF_3$;
$n = 0$ or 1 to 5;
$m = 0$ or 1;
$k/l = 3-16$ preferably 5-13.
$M = H, NH_4$, or alkali metal such as Na, K.
such as;

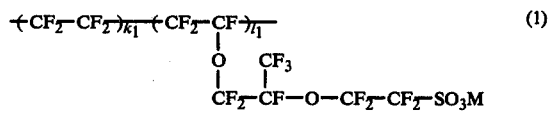 (1)

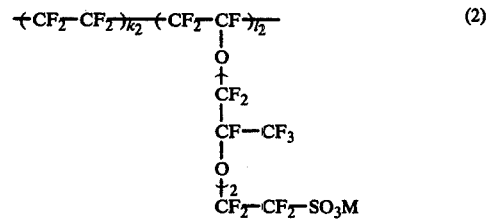 (2)

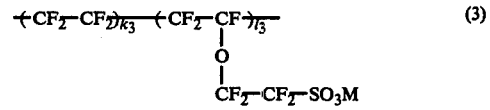 (3)

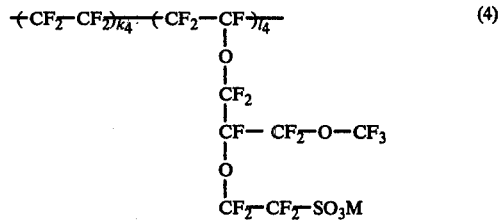 (4)

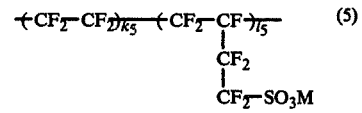 (5)

The copolymer preferably contains sulfonic acid groups in a ratio of one per 700 to 2800 of molecular weight.

(B) Carboxylic acid type fluorinated polymers:

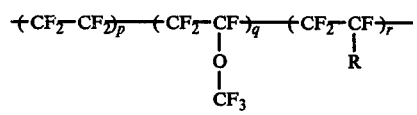

R represents
A, $-O(CF_2)_a-A$,
$-O(CF_2-CF-O)_b-(CF_2)_2-A$, or
       $|$
       $CF_3$
$(CF_2)_c-A$.

a = 2 to 4;
b = 0 or 1 to 5;
c = 1 to 5;
A = —COOM; M : H, or alkali metal such as Na, K.
(p + q)/r = 0.5–19 preferably 1–10. such as;

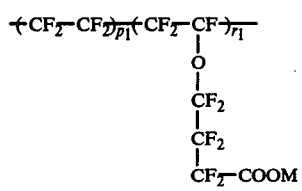  (1)

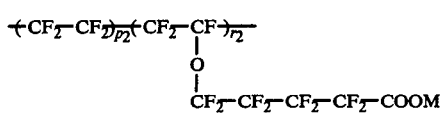  (2)

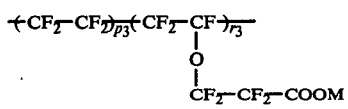  (3)

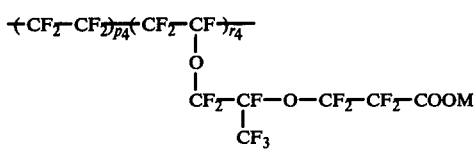  (4)

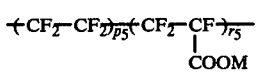  (5)

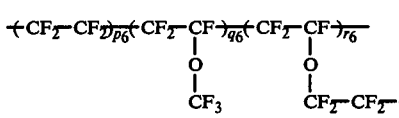  (6)

-continued

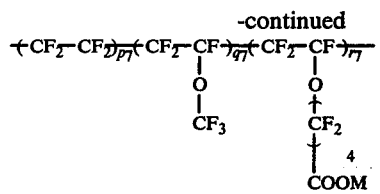  (7)

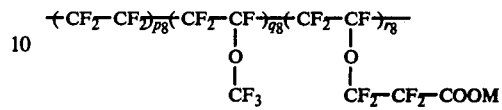  (8)

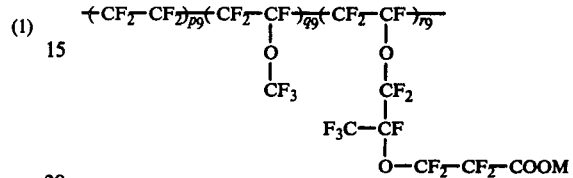  (9)

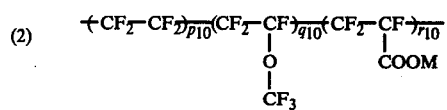  (10)

The copolymer preferably contains carboxylic groups in a ratio of one per 220 to 2700 of the molecular weight.

(C) Sulfonic acid and carboxylic acid type fluorinated polymers:

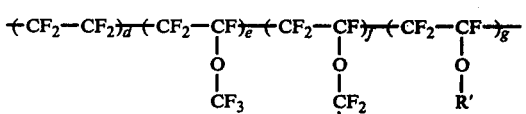

$R' = -CF_2-CF_2-CF_2-COOM$
       $-CF_2-CF-O-CF_2-CF_2-COOM$
              $|$
              $CF_3$

M=H, or alkali metal such as Na, K.
(d + e)/f = 0.5–17 preferably 1–13;
(d + e)/g = 0.3–14 preferably 0.8–8;
f/g = 0.2–2.2 preferably 0.25–1.8. such as;

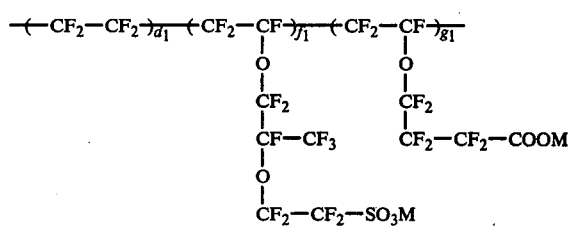  (1)

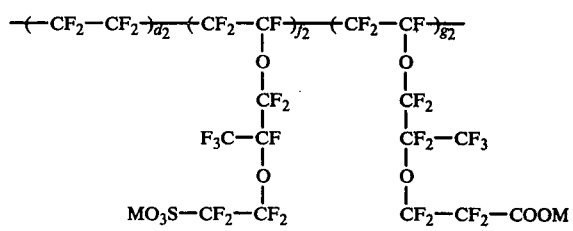  (2)

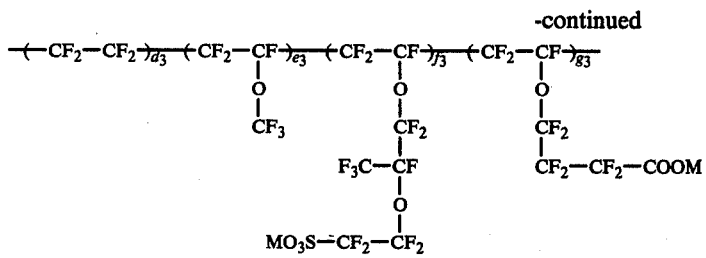
(3)

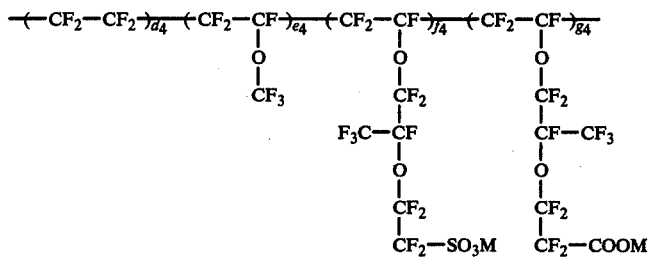
(4)

The copolymer preferably contains sulfonic acid groups in a ratio of one per 700 to 4300 of the molecular weight and carboxylic groups in a ratio of one per 480 to 2600 of the molecular weight. These examples of the units for the fluorinated polymers having cation-exchangeable groups are only schematic illustrations and the combinations of the units can be determined by the copolymerization ratio of the monomers.

The typical monomers are as follows:

Monomers having a cation-exchangeable group or a functional group which can be converted to a cation-exchangeable group:

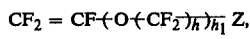

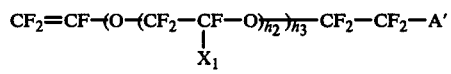

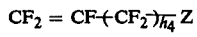

$Z = -CN, -COF, -COOH, -COOR_1, -COOM$ or $-CONR_2R_3$
$R_1 = C_1-C_{10}$ alkyl group;
$R_2, R_3 = H$, or $R_1$;
$M$ = alkali metal;
$A' = -SO_2X', -COX'$;
$X' = F$ or $-OY$;
$Y = H, M, NH_4$, or $R_1$;
$X_1 = F, -CF_3$ or $-CF_2-O-CF_3$;
$h = 2$ to 12;
$h_1 = 0$ or 1; $h_2 = 0$ or 1 to 5; $h_3 = 0$ or 1;
$h_4 = 1$ to 5.

Monomers which do not have a cation-exchangeable group or a functional group convertible to a cation-exchangeable group and can be copolymerized with the above monomer:
$CF_2 = CF_2$
$CF_2 = CF-CF_3$

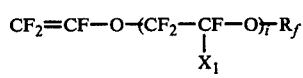

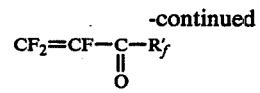

$R_f = -C_6F_5, -CF_2X''$
$X_1' = -F, -CF_3, -CF_2-O-CF_3$;
$X'' = -F$ or $C_1-C_5$ perfluoroalkyl group;
$R_f' = C_1 - C_5$ perfluoroalkyl group;
$i = 0$ or 1 to 5.
$CF_3NO$

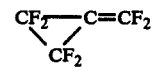

Suitable typical fluorinated monomers include

A group:

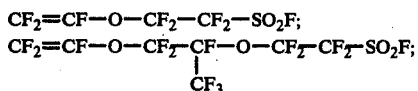
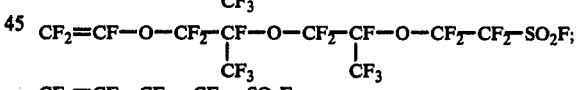
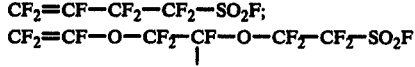

$CF_2=CF-O-CF_2-CF-O-CF_2-CF_2-SO_2F$
$\quad\quad\quad\quad\quad\quad\quad |$
$\quad\quad\quad\quad\quad\quad\quad CF_2$
$\quad\quad\quad\quad\quad\quad\quad |$
$\quad\quad\quad\quad\quad\quad\quad O-CF_3$ B group:
$CF_2 = CF-O-CF_2-CF_2-COF$;
$CF_2 = CF-O-CF_2-CF_2-CF_2-COF$;
$CF_2 = CF-O-CF_2-CF_2-CF_2-CF_2-COOCH_3$

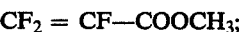
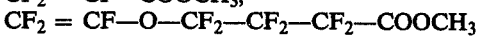

$CF_2 = CF-COOCH_3$;
$CF_2 = CF-O-CF_2-CF_2-CF_2-COOCH_3$

C group:
$CF_2 = CF-CF_3$;

$CF_2 = CF—O—CF_3$;
$CF_2 = CF—O—CF_2CF_3$;
$CF_2 = CF_2$;
$CF_2 = CF—O—CF_2—CF_2—CF_3$

The monomers in A group are used for introducing sulfonic acid groups. The monomers in B group are used for introducing carboxylic acid groups. The monomers in C group are used for copolymerization with the monomer in A group and/or B group.

The other cation-exchange membranes used in the present invention are prepared by the impregnation method.

The following are typical examples for preparing the cation-exchange membranes by the impregnation method.

(1) One or more monomer in B group with or without the monomer in C group are absorbed into the sulfonic acid type cation-exchange membrane and are polymerized and hydrolyzed to introduce carboxylic acid groups.

Suitable monomers in B group include
$CF_2 = CF—O—CF_2—CF_2—CF_2—COF$;

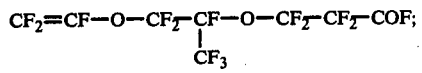

$CF_2 = CF—O—CF_2—CF_2—CF_2COOCH_3$.

Suitable monomers in C group include
$CF_2 = CF_2$;
$CF_2 = CF—O—CF_3$;
$CF_2 = CF—O—CF_2—CF_2—CF_3$.

(2) One or more monomer in A group with or without the monomer in C group are absorbed into the carboxylic acid type cation-exchange membrane and are polymerized and hydrolyzed to introduce sulfonic acid groups.

Suitable monomers in A group include

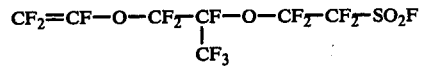

Suitable monomers in C group include
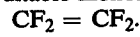 $CF_2 = CF_2$.

These cation-exchange membranes can be reinforced with reinforcing materials such as glass fiber cloth, and polyester fiber cloth, fluorinated polymer fiber cloth for improving characteristics of the membrane. In the preparation of the reinforced membrane, the cloth can be inserted before or after the polymerization of the fluorinated monomers.

The surface or a part of the fluorinated polymer membrane can be chemically modified such by amidation.

The diene monomers which are impregnated and polymerized can be as follows:
(1) conjugated diene monomers and non-conjugated diene monomers which have carboxylic acid groups such as

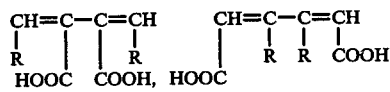

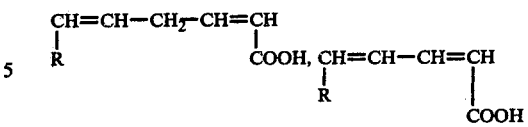

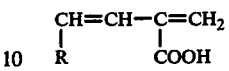

wherein R represents hydrogen and halogen atom, a carboxylic acid group or a $C_1$-$C_5$ alkyl group.

(2) conjugated diene monomers and non-conjugated diene monomers having a group which can be converted to a carboxylic acid group such as

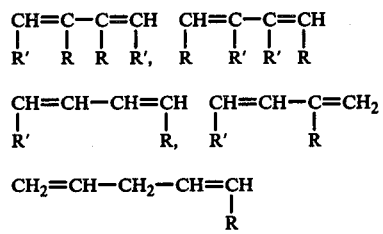

wherein R represents COCl, CN, CONHR" and COOR"; and R" represents a $C_1$-$C_5$ alkyl group; and R' represents hydrogen and halogen atom and a $C_1$-$C_5$ alkyl group.

The fluorinated polymer membranes can be treated in the following ways.
(1) The fluorinated polymer membrane is swollen with a water miscible organic solvent and the solvent is removed under a reduced pressure or atmospheric pressure.
(2) The fluorinated polymer membrane is swollen with a water miscible organic solvent and the swollen membrane is heat-treated.
(3) The fluorinated polymer membrane is not treated with a solvent as in process (1) or (2).

The water miscible organic solvents used in the treatment of the present invention should swell the membrane treated and have a solubility in water more than 0.1 g/100 g $H_2O$ and are preferably the organic solvents which rapidly swell the membrane and are easily vaporized so as to be removed from the membrane.

Suitable water miscible organic solvents include aliphatic monohydric alcohols such as methanol, ethanol, propanol, butanol; ketones such as acetone, methyl ethyl ketone, diethyl ketone; esters such as methyl acetate, ethyl acetate, propyl acetate; aliphatic ethers such as ethyl ether, propyl ether; tetrahydrofuran, dioxane and chloroform.

The organic solvents can be used as mixtures. The solvent mixture can also contain another solvent which swells the membrane but does not improve the characteristics of the membrane such as water.

In the swelling operation, the membrane is dipped in the water miscible organic solvent so as to be swollen. The conditions are not limited and the temperature can be from 0° C. to the boiling point of the solvent.

In the solvent removing operation, the organic solvent can be removed from the membrane by heating or drying under a gas flow of air, nitrogen gas or other inert gas, drying in vacuum or other conventional processes.

The cation-exchange membrane is usually swollen with the above-mentioned water miscible organic solvent and then, the solvent is removed from the membrane.

The degree of swelling which is the percentage weight increase of the swollen membrane over the weight of the dry membrane is more than 3 wt.%, preferably more than 5 wt.%.

It is preferable to remove the organic solvent by evaporating it by heating so as to complete the annealing of the membrane.

It is especially preferable to hold the membrane impregnated with the organic solvent between a pair of smooth plates such as glass plates, polytetrafluoroethylene plates, stainless steel plates with or without wiping off the surface of the membrane and then to evaporate the solvent by heating the swollen membrane so as to complete the annealing of the membrane and to hold the shape of the membrane without deformation.

The heat treatment for removing the organic solvent can be in a range of higher than room temperature to 200° C. and preferably 70° to 110° C. for 30 minutes to 30 hours.

The temperature in the process for impregnating the diene monomer into the three types of cation-exchange membranes ranges from 0° C. to 100° C. and preferably 20° to 80° C. The time for impregnating the diene monomer ranges from 5 minutes to 50 hours.

In the process for impregnating the diene monomer into the fluorinated polymer membrane, a suitable solvent can be used.

Suitable solvents include aliphatic monohydric alcohols such as methanol and ethanol; ketones such as acetone, methyl ethyl ketone and diethyl ketone; esters such as methyl acetate and ethyl acetate; ethers such as ethyl ether, propyl ether, tetrahydrofuran and dioxane and chloroform. The organic solvents can be used as mixtures.

The partial polymerization after the impregnation step can be a radical polymerization for polymerizing the diene monomer in the presence of a radical initiator such as azobisisobutyronitrile; a photopolymerization under the addition of a sensitizer such as benzophenone, radiation-induced polymerization under radiation of high energy such as $\gamma$-rays and electron rays or thermal polymerization.

The partial polymerization is usually carried out at 40° to 150° C. for 5 minutes to 10 hours.

Then, the membrane prepared by the partial polymerization of the diene monomer is swollen with a water miscible organic solvent which has a solubility in water of more than 0.1 g/100 g $H_2O$ and is preferably an organic solvent which rapidly swells the membrane and is easily vaporized so as to be removed from the membrane.

Suitable water miscible organic solvents include aliphatic monohydric alcohols such as methanol, ethanol, propanol, butanol, ketones such as acetone, methyl ethyl ketone, diethyl ketone; esters such as methyl acetate, ethyl acetate, propyl acetate; aliphatic esters such as ethyl ether, propyl ether; tetrahydrofuran, dioxane and chloroform. The organic solvents can be used as mixtures thereof.

Partial polymerization of the diene monomer means that the polymerized part is swellable with the water miscible organic solvent.

The final heat treatment of the swollen membrane is carried out at 40° to 200° C. for 10 minutes to 50 hours.

When the diene monomer (2) is used, the functional groups are converted to carboxylic acid groups by hydrolysis, etc.

The reason why the excellent cation-exchange membrane of the present invention results is that cross-linkages of the diene monomer impregnated into the membrane are not formed to any great extent but rather a linear polymer is formed with double bonds by the partial polymerization. Hence, the cation-exchange membrane prepared by the partial polymerization can be swollen with the solvent whereby the cation-exchangeable groups of the cation-exchange membrane are orientated to effectively block OH ions.

When the heat treatment is carried out, the polymerization of the double bonds in the linear polymer or the unreacted diene monomer is completed to form cross-linkages in the membrane whereby the cation-exchangeable groups are fixed in suitable orientations. (A part of the diene monomer is extracted with the solvent in the swelling step).

The diene monomer having carboxylic acid groups or groups convertible to carboxylic acid has a cation-exchangeable group and a crosslinkable group; hence the diene monomer can be used with or without the another monomer. The resistance of the cation-exchange membrane is not highly increased and sometimes, it is slightly decreased.

In the heat treatment, it is preferable to hold the membrane between a pair of smooth plates such as glass plates, polytetrafluoroethylene plates, stainless steel plates, and then, to evaporate the solvent by heating the swollen membrane at room temperature to 200° C., preferably room temperature to 150° C.

The permeability of hydroxyl ions through the cation-exchange membrane is lowered by the treatment of the present invention.

Usually, the fluorinated polymers having no functional group are water-repellent and oil-repellent. The basic membrane may tend to be water-repellent and oil-repellent. However, the affinity of the membrane for the water miscible organic solvent is increased because of the highly hydrophilic character of the cation-exchangeable groups in the membrane whereby the membrane is swollen. When the solvent is removed from the swollen membrane, the arrangement of the basic cation-exchangeable groups is affected to effectively decrease the permeation of hydroxyl ions.

The basic cation-exchange membrane is of the non-crosslinking type whereby the arrangement of the cation-exchangeable groups is easily changed during long operation because of swelling. Accordingly, it is preferable to fix the desired arrangement of the basic cation-exchangeable groups.

When the monomer is impregnated into the membrane and is polymerized, the molecules of the basic membrane are bonded to the molecules of the resulting polymer with some crosslinkage. Accordingly, the cation-exchangeable groups are fixed in the desired arrangement which will not be easily changed. However, a part of the desired arrangement of the cation-exchangeable groups is changed by the treatment. Accordingly, it is preferable to treat the resulting membrane by the treatment with the water miscible organic solvent so as to arrange the cation-exchangeable groups in the desired arrangement.

The present invention will be further illustrated by certain examples.

In the examples, the cation transport number of the membrane was measured by Nernst's formula from the membrane potential between 0.5N—NaOH and 2.5N—NaOH.

The electric resistance of the membrane was measured by the AC bridge method at 1000 C/S in 2.0% aqueous solution of sodium hydroxide at 25° C.

EXAMPLES 1 to 3

A cation-exchange membrane having a thickness of 0.25 mm and a structure

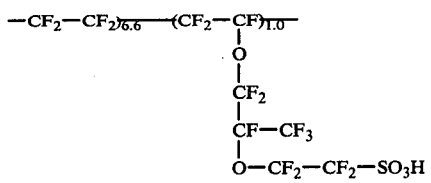

was used.

The cation-exchange membrane can be prepared by copolymerizing tetrafluoroethylene and a monomer

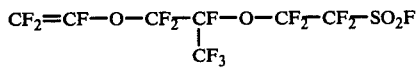

and molding the resulting copolymer and hydrolyzing it.

The electric resistance of the membrane was 2.0 $\Omega cm^2$ and the cation transport number of the membrane was 82%. (membrane -1)

The cation-exchange membrane was dipped into ethanol at room temperature for one day and it was dried in vacuum to remove ethanol from the membrane. (membrane-2).

The cation-exchange membrane was swollen in ethanol at 25° C. and was held between a pair of glass plates and it was heat-treated at 80° C. for 20 hours. (membrane-3).

A solution of butadiene-1-carboxylic acid in ethyl ether(25 wt.%) was prepared and the membranes-1, 2 and 3 were respectively dipped into the solution at 25° C. for 5 hours.

After dipping, the cation-exchange membranes were respectively taken out and the surface of each membrane was wiped off and the membrane was held between a pair of glass plates and the membrane was heated at 80° C. for 4 hours to partially polymerize the monomers.

The resulting membranes were respectively dipped into ethanol for 15 minutes, and heated at 95° C. for 24 hours to obtain cation-exchange membranes —4, —5, and —6.

On the other hand, the membrane-1 was dipped into the solution of butadiene-1-carboxylic acid at 25° C. for 5 hours. After dipping, the cation-exchange membrane was taken out and the surface of the membrane was wiped off and the membrane was held between a pair of glass plates and the membrane was heated at 95° C. for 24 hours to polymerize it. (Reference).

The results are shown in Table 1.

Table 1

| Membrane | | Electric resistance ($\Omega$ cm$^2$) | Cation transport number (%) |
|---|---|---|---|
| Example 1 | 4 | 2.9 | 97.2 |
| Example 2 | 5 | 3.0 | 97.8 |
| Example 3 | 6 | 3.0 | 97.8 |
| Reference | — | 3.7 | 96.1 |

EXAMPLE 4

A teflon fiber reinforced cation-exchange membrane having two layers of A and B was used.

A layer: thickness of 0.05 mm structure

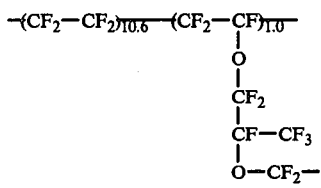

B layer: thickness of 0.10 mm structure

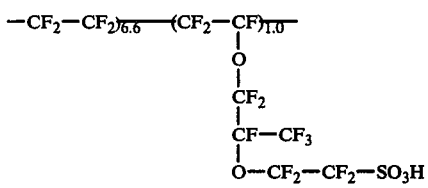

The cation-exchange membrane was dipped into methanol under refluxing for 5 hours and the membrane was taken out and it was held between a pair of glass plates and it was heated at 80° C. for 20 hours. (membrane-7).

The swollen membrane was dipped into 25 wt.% solution of butadiene-1-carboxylic acid in ethyl ether at 25° C. for 6 hours. After dipping, the membrane was taken out and the surface of the membrane was wiped off and the membrane was held between a pair of glass plates and heated at 80° C. for 6 hours to partially polymerize the monomer and then the membrane was dipped into methanol for 15 minutes. The membrane was taken out and held between a pair of glass plates and was heated at 95° C. for 24 hours to obtain a cation-exchange membrane. (membrane-8).

On the other hand, the membrane-7 was dipped into 25% solution of butadiene-1-carboxylic acid in ether at 25° C. for 6 hours. After dipping it, the cation-exchange membrane was taken out and the surface of the membrane was wiped off and the membrane was held between a pair of glass plates and the membrane was heated at 95° C. for 24 hours to obtain a cation-exchange membrane. (Reference).

The results are shown in Table 2.

Table 2

| Membrane | | Electric resistance ($\Omega$ cm$^2$) | Cation transport number (%) |
|---|---|---|---|
| Example 4 | 8 | 4.2 | 98.1 |
| Reference | — | 6.0 | 96.4 |

EXAMPLE 5

The cation-exchange membrane used in Example 4 was dipped into butadiene-1-carboxylic acid chloride at 25° C. for 4 hours. After dipping, the membrane was taken out and the surface of the membrane was wiped off and it was held between a pair of glass plates and heated at 80° C. for 5 hours to partially polymerize the monomer. The membrane was dipped into methanol for 15 minutes and then it was heat-treated at 95° C. for 24 hours.

The resulting membrane was hydrolyzed in 10% NaOH aqueous solution to obtain a cation-exchange membrane.

The electric resistance and the cation transport number of the cation-exchange membrane were 4.1 $\Omega cm^2$ and 98.0%, respectively.

EXAMPLE 6

The membrane-3 used in Example 1 was dipped into 25 wt.% of butadiene-2-carboxylic acid in ethyl ether at 25° C. for 5 hours. After dipping, the membrane was taken out and the surface of the membrane was wiped off and the membrane was held between a pair of glass plates and heated at 80° C. for 4 hours to partially polymerize the monomer.

The resulting membrane was dipped into ethanol for 15 minutes and was heated at 95° C. for 24 hours to obtain a cation-exchange membrane.

The electric resistance and the cation transport number of the cation-exchange membrane were 3.0 $\Omega cm^2$ and 97.5%, respectively.

EXAMPLE 7

An electrolytic cell having 30 cm × 30 cm of effective area was prepared by using the cation-exchange membrane as the diaphragm for partitioning an anode compartment and a cathode compartment.

An aqueous solution having 310 g/l of concentration was fed to the anode compartment at a rate of 7418 g per hour and water was fed to the cathode compartment so as to give 20% of the concentration of sodium hydroxide at the outlet of the cathode compartment and the electrolysis was carried out by feeding 180 amp. of current.

The membrane-8 and Reference in Example 4 were used as the cation-exchange membranes.

|  | Current efficiency (%) |
|---|---|
| Membrane-8 | 96.2 |
| Reference | 92.4 |

EXAMPLE 8

A copolymer of tetrafluoroethylene and a monomer having the formula $$CF_2 = CF-O(CF_2)_3COOCH_3$$

was molded in the form of a membrane and then, it was hydrolyzed to obtain a carboxylic acid type cation-exchange membrane (thickness: 0.2 mm).

The membrane had a structure

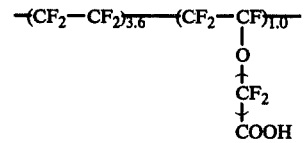

The membrane was dipped into methanol for 30 hours and the membrane was held between a pair of glass plates and it was heated at 95° C. for 4 hours.

The membrane was dipped into 30 wt.% solution of butadiene-1-carboxylic acid in ethyl ether containing 0.01 wt.% of benzoyl peroxide at 25° C. for 20 hours. After dipping, the membrane was taken out and the surface of the membrane was wiped off and the membrane was heated at 80° C. for 3 hours to partially polymerize it. The resulting membrane was dipped into methanol for 15 minutes and the membrane was held between a pair of glass plates and heated at 90° C. for 10 hours.

On the other hand, the membrane prepared by dipping the untreated membrane into the monomer solution and polymerizing the monomer was used as Reference.

In accordance with the process of Example 7 except using the resulting cation-exchange membrane, the current efficiency was measured.

The results are as follows:

| Membrane | Current efficiency (%) |
|---|---|
| Example 8 | 98.1 |
| Reference | 93.8 |

EXAMPLE 9

A terpolymer of tetrafluoroethylene and a monomer having the formula $$CF_2 = CF-O(CF_2)_3COOCH_3$$

and a monomer

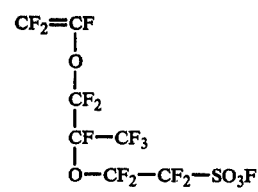

was molded in the form of a membrane and was hydrolyzed to obtain a sulfonic acid-carboxylic acid type cation-exchange membrane (thickness: 0.19 mm).

The membrane had a structure

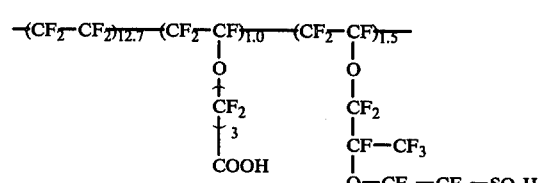

The membrane was dipped into methanol for 5 hours and the membrane was held between a pair of glass plates and heated at 85° C. for 10 hours.

The resulting membrane was dipped into 30 wt.% solution of butadiene-1-carboxylic acid in ethyl ether containing 0.02 wt.% of azobisisobutyronitrile at 25° C. for 20 hours. After dipping, the membrane was taken out and the surface of the membrane was wiped off and the membrane was heated at 80° C. for 4 hours to partially polymerize it.

The resulting membrane was dipped into methanol for 15 minutes and the membrane was held between a pair of glass plates and heated at 90° C. for 10 hours.

On the other hand, the membrane prepared by dipping the untreated membrane into the monomer solution and polymerizing the monomer was used as Reference.

In accordance with the process of Example 7 except using the resulting cation-exchange membrane, the current efficiency was measured. The results are as follows:

| Membrane | Current efficiency (%) |
|---|---|
| Example 9 | 97.8 |
| Reference | 93.1 |

EXAMPLE 10

The membrane used in Example 9 was dipped into chloroform for 24 hours. The membrane was held between a pair of glass plates and was heated at 95° C. for 7 hours.

Then, the membrane was dipped into 50 wt.% solution of butadiene-1-carboxylic acid chloride in ethyl ether at 25° C. for 5 hours. After dipping, the surface of the membrane was wiped off and the membrane was held between a pair of glass plates and was heated at 85° C. for 6 hours to partially polymerize the monomer. The resulting membrane was dipped into chloroform for 3 hours and the membrane was held between a pair of glass plates and heated at 90° C. for 10 hours. The membrane was hydrolyzed to convert —COCl groups to —COOH groups to obtain a cation-exchange membrane.

On the other hand, the membrane prepared by dipping the untreated membrane into the monomer solution, polymerizing the monomer and hydrolyzing the polymer was used as a Reference.

In accordance with the process of Example 7 except using the resulting cation-exchange membrane, the current efficiency was measured. The results are as follows:

| Membrane | Current efficiency (%) |
|---|---|
| Example 10 | 97.0 |
| Reference | 92.1 |

What is claimed is:

1. A process for preparing a cation-exchange membrane which comprises impregnating a diene monomer having at least one carboxylic acid group or functional group which can be converted to a carboxylic acid group into a fluorinated polymer membrane having cation-exchangeable groups;
    partially polymerizing said diene monomer;
    swelling said membrane with a water miscible organic solvent and heat-treating the swollen membrane and converting to carboxylic acid groups said functional groups which can be converted to carboxylic acid groups.

2. A process according to claim 1, wherein said fluorinated polymer membrane having cation-exchangeable groups is treated by swelling it with a water miscible organic solvent and removing said solvent under reduced pressure or atmospheric pressure before impregnating said diene monomer.

3. A process according to claim 1, wherein said fluorinated polymer membrane having cation-exchangeable groups is treated by swelling it with a water miscible organic solvent and heat-treating it before impregnating said diene monomer.

4. A process according to claim 1, wherein said water miscible solvent is miscible with water at least to the extent of 0.1 g/100 g $H_2O$.

5. A process according to claim 1, wherein said water miscible solvent is selected from the group consisting of aliphatic alcohols, esters, ketones, ethers and chloroform.

6. A process according to claim 1, wherein said water miscible solvent is methanol, ethanol, propanol or butanol.

7. A process according to claim 1, wherein said water miscible solvent is a lower alkyl ester, tetrahydrofuran or chloroform.

8. A process according to claim 1, wherein said fluorinated polymer membrane contains, after hydrolysis, acidic groups selected from the group consisting of sulfonic acid groups and carboxylic acid groups as cation exchangeable groups.

9. A process according to claim 1, wherein said diene monomer having a carboxylic acid group or a functional group which can be converted to a carboxylic acid group is a conjugated diene monomer.

10. A process according to claim 1, wherein said partial polymerization is carried out by thermal polymerization, radical polymerization, photopolymerization or radiation-induced polymerization, to such an extent that said cation-exchange membrane is swellable by said water miscible organic solvent.

11. A process according to claim 1, wherein said diene monomer having a carboxylic acid group or a functional group which can be converted to a carboxylic acid group is a non-conjugated diene monomer.

* * * * *